(12) United States Patent
Gibson et al.

(10) Patent No.: US 12,003,258 B2
(45) Date of Patent: Jun. 4, 2024

(54) IDENTIFICATION DEVICE, LICENSE PLATE ARRANGEMENT AND LICENSE PLATE SYSTEM

(71) Applicant: Marcon International, Inc., Harrisburg, NC (US)

(72) Inventors: Sarah Gibson, Harrisburg, NC (US); Richard McKinney, Charlotte, NC (US)

(73) Assignee: Marcon International, Inc., Harrisburg, NC (US)

( * ) Notice: Subject to any disclaimer, the term of this patent is extended or adjusted under 35 U.S.C. 154(b) by 160 days.

(21) Appl. No.: 17/535,402

(22) Filed: Nov. 24, 2021

(65) Prior Publication Data

US 2023/0163793 A1   May 25, 2023

(51) Int. Cl.
*H04B 1/034*   (2006.01)
*B60R 13/10*   (2006.01)
*G06K 19/07*   (2006.01)

(52) U.S. Cl.
CPC ............. *H04B 1/034* (2013.01); *B60R 13/10* (2013.01); *G06K 19/0723* (2013.01)

(58) Field of Classification Search
CPC ................ B60R 13/10; G06K 19/0723; G08B 13/2434; G08B 13/2454; G08B 13/2462; G08B 13/2465; H04B 1/034
See application file for complete search history.

(56) References Cited

U.S. PATENT DOCUMENTS

| 7,042,356 | B2 | 5/2006 | Kent | |
|---|---|---|---|---|
| 10,814,833 | B1 * | 10/2020 | Goetzinger | B60R 25/23 |
| 2004/0207526 | A1 | 10/2004 | Liao et al. | |
| 2007/0171077 | A1 | 7/2007 | Kawarizadeh | |
| 2011/0181393 | A1 * | 7/2011 | Tillotson | F16B 31/02 |
| | | | | 73/761 |
| 2020/0398788 | A1 * | 12/2020 | Nyalamadugu | B60R 25/24 |
| 2022/0178176 | A1 * | 6/2022 | Müller | G08B 13/149 |

FOREIGN PATENT DOCUMENTS

| CN | 207428745 | 6/2018 |
|---|---|---|
| KR | 101989825 | 6/2019 |
| TW | 201208918 | 3/2012 |
| WO | WO 2008/020771 | 2/2008 |
| WO | 2020200668 | 10/2020 |
| WO | 2023097173 | 6/2023 |

OTHER PUBLICATIONS

"International Application Serial No. PCT US2022 080170, International Search Report dated Mar. 10, 2023", 4 pgs.
"International Application Serial No. PCT US2022 080170, Written Opinion dated Mar. 10, 2023", 6 pgs.

* cited by examiner

*Primary Examiner* — Omer S Khan (74) *Attorney, Agent, or Firm* — Schwegman Lundberg & Woessner, P.A.

(57) ABSTRACT

An identification device for a license plate, the identification device comprising a base structure for attachment to the license plate; a movable member movable relative to the base structure between a retracted position and an extended position; and electronic circuitry configured to transfer identification data associated with the identification device. A license plate arrangement comprising a license plate and an identification device, and a license plate system comprising at least one license plate arrangement, are also provided.

12 Claims, 8 Drawing Sheets

IDENTIFICATION DEVICE, LICENSE PLATE ARRANGEMENT AND LICENSE PLATE SYSTEM

TECHNICAL FIELD

The present disclosure generally relates to an identification device. In particular, an identification device for a license plate, a license plate arrangement and a license plate system, are provided.

BACKGROUND

In many jurisdictions, dealer license plates are only allowed to be used on a vehicle by a person affiliated with the dealership of the vehicle, such as an owner, an employee or a customer that is test driving the vehicle. A dealer license plate is normally only allowed to be placed on a vehicle that is held for sale.

Dealer license plates are often stolen from dealerships. For a vehicle dealer, the loss of a dealer license plate can be very expensive. For example, if the dealer cannot account for all dealer license plates during an inspection by an authority, the dealer may face substantial fines. Although license plates can be locked in a cabinet, prior art solutions do not enable the vehicle dealer to automatically keep track of which license plates are held therein.

US 2004207526 A1 discloses a multifunctional identification and management device for vehicles that implants a chip in the automobile and the license plate for identification and comparison with comparison numbers or data provided. By comparing the comparison number built in the two chips, a specific detector sends out an error message if the numbers do not match. If the comparison numbers or data match, the policemen, security guard or parking lot manager can examine the identity of the automobile, ban or fine for violating the law as well as emit unusual frequency or signal to notify the police station automatically, so as to enhance working performance and prevent automobiles and license plate from being stolen and being used in a crime.

SUMMARY

One object of the present disclosure is to provide an improved identification device for a license plate.

A further object of the present disclosure is to provide an identification device for a license plate, which identification device enables improved tracking and identification of the license plate.

A still further object of the present disclosure is to provide an identification device for a license plate, which identification device enables improved storage of the license plate.

A still further object of the present disclosure is to provide an identification device for a license plate, which identification device enables improved attachment of the license plate to a vehicle.

A still further object of the present disclosure is to provide an identification device for a license plate, which identification device enables attachment of the license plate to a vehicle with little or no obscurement of information on the license plate.

A still further object of the present disclosure is to provide an identification device for a license plate, which identification device enables attachment of the license plate to a vehicle with little or no interference of the identification device with the vehicle.

A still further object of the present disclosure is to provide an identification device for a license plate, which identification device has a compact design.

A still further object of the present disclosure is to provide an identification device for a license plate, which identification device has a tamper proof design.

A still further object of the present disclosure is to provide an identification device for a license plate, which identification device can be attached to the license plate with little or no modification of the license plate.

A still further object of the present disclosure is to provide an identification device for a license plate, which identification device solves several or all of the foregoing objects in combination.

A still further object of the present disclosure is to provide a license plate arrangement solving one, several or all of the foregoing objects.

A still further object of the present disclosure is to provide a license plate system solving one, several or all of the foregoing objects.

According to a first aspect, there is provided an identification device for a license plate, the identification device comprising a base structure for attachment to the license plate; a movable member movable relative to the base structure between a retracted position and an extended position; and electronic circuitry configured to transfer identification data associated with the identification device.

Since the identification device can be attached to the license plate and since the identification device comprises the electronic circuitry, the identification device can be used to track and identify the license plate. The movement of the movable member between the retracted position and the extended position enables a dual functionality of the identification device. Since the movable member can adopt the retracted position, attachment of the license plate to the vehicle is facilitated and a risk that the movable member damages the vehicle is reduced. In the extended position, the movable member can be received in a storage hole in a storage such that the license plate is suspended from the storage hole. The movable member can thus provide suspension functionality in the extended position. When the license plate is suspended in the storage, the identification data associated with the identification device and the license plate can be read by a reader in the storage.

The movable member may be manually movable between the retracted position and the extended position, for example by hand of a human. The base structure may comprise a slot. The movable member may travel in the slot between the retracted position and the extended position. Alternatively, or in addition, the base structure may comprise a retracted position seat in which the movable member is seated in the retracted position, and an extended position seat in which the movable member is seated in the extended position. In this way, the base structure can provide two distinct positions for the movable member. The movable member may move out from each of the retracted position seat and the extended position seat against an elastic deformation of the base structure. The retracted position seat and/or the extended position seat may be arc-shaped.

The base structure may comprise a license plate seat. An edge of the license plate may be seated in the license plate seat when the identification device is attached to the license plate. The license plate seat may be a step having two perpendicular surfaces.

The electronic circuitry may be located in the movable member. In this way, the electronic circuitry will come closer to the reader in the storage when the movable member enters the storage hole. Moreover, elongated intelligent fobs (iFobs) are commercially available and can be used as the movable member comprising the electronic circuitry.

The movable member may be rotatable relative to the base structure between the retracted position and the extended position. The ability of the movable member to rotate in this way contributes to enabling a small size of the identification device. In some variants, the base structure only serves to provide a pivot for the movable member, seats for the movable member in the retracted position and the extended position, and an attachment structure for attachment to the license plate. The pivot may comprise a pivot pin connected to, or integrally formed with, the base structure. The attachment structure may comprise the license plate seat.

As possible alternatives, the movable member may be linearly movable and/or telescopically movable between the retracted position and the extended position.

The movable member may be rotatable at least 80 degrees between the retracted position and the extended position. For example, an angular distance of the movable member between the retracted position and the extended position may be 90 degrees.

The movable member may be elongated. A length of the movable member may be at least three times a width of the movable member. The movable member may comprise a cylindrical portion. In this case, the width of the movable member may be the diameter of the cylindrical portion.

In the retracted position, the movable member may be parallel with the license plate and offset from the license plate in a direction normal to the license plate when the identification device is connected to the license plate.

The movable member may for example be positioned in front of the license plate and extend in a longitudinal direction along a long side of the license plate in the retracted position.

In the extended position, the movable member may be parallel with the license plate and may protrude outside the license plate when the identification device is connected to the license plate. The movable member may for example be positioned in front of the license plate and extend transverse to a long side of the license plate in the extended position.

The base structure may comprise two halves. The halves may be fastened together, for example by means of screws. The movable member may be positioned between the halves.

The base structure may be made of plastic.

The base structure may be transparent. In this way, the base structure obscures less information on the license plate.

The electronic circuitry may be configured to wirelessly transmit the identification data. To this end, the electronic circuitry may comprise a remotely machine readable identification tag. The electronic circuitry may for example comprise a radio-frequency identification (RFID) tag. The RFID tag may be passive. Each reader may comprise a transceiver, an antenna and a source for generating and interrogating radio-frequency (RF) signals connected to the transceiver. The interrogating RF signal from the source may have a suitable frequency, such as 915 MHz. When the source is energized, the transceiver transmits the interrogating RF signal through the antenna to a suitable antenna (such as a dipole antenna) of the RFID tag. The RFID tag may include a data source, such as a read-only memory (ROM), which provides a sequence of binary 1's and binary 0's in an individual pattern to provide the identification data for identification of the identification device and the license plate. In further examples of wirelessly transmitting the identification data, the electronic circuitry may comprise an infrared transmitter or an NFC (near-field communication) transmitter. Alternatively, the movable member may comprise a movable member contact that is brought into electrical contact with a reader contact when the movable member is received in a storage hole.

According to a second aspect, there is provided a license plate arrangement comprising a license plate and an identification device according to the first aspect fixedly attached to the license plate. Throughout the present disclosure, the license plate may be a dealer license plate.

The movable member may be movable between the retracted position and the extended position in a plane parallel with the license plate.

The license plate arrangement may further comprise a fastener. In this case, the identification device may be fixedly attached to the license plate by the fastener.

The fastener may be a deformable single use fastener. Upon attachment of the identification device to the license plate by the fastener, the fastener is deformed. The identification device cannot be removed from the license plate without breaking the identification device and/or the license plate. In this way, the fastener contributes to a tamper proof design. The fastener may be a pop rivet. The pop rivet is a deformable single use fastener.

According to a third aspect, there is provided a license plate system comprising at least one license plate arrangement according to the second aspect and a storage configured to store the at least one license plate arrangement. The storage may comprise an access member, such as a door, movable between an open position and a closed position. The access member may be lockable in the closed position. In this way, one or more license plate arrangements can be locked in the storage.

The storage may comprise one or more storage holes, each for receiving the movable member in the extended position. By storing one or more license plate arrangements in the storage such that the movable member of each license plate arrangement is received in a unique storage hole, the storage enables an orderly storage of one or more license plates. The storage may comprise a plurality of horizontally offset storage holes.

The storage may comprise a reader configured to receive the identification data from the electronic circuitry. The storage may comprise one reader associated with each storage hole. In this way, the storage can determine which license plates are in the storage at each given time.

The license plate system may further comprise an electronic control system including at least one data processing device and at least one memory having at least one computer program stored thereon, the at least one computer program comprising program code which, when executed by the at least one data processing device, causes the at least one data processing device to perform the steps of receiving the identification data from the reader; and storing the identification data. The at least one computer program may further comprise program code which, when executed by the at least one data processing device, causes the at least one data processing device to perform, or command performance of, various steps described herein. The control system may be configured to store time information representative of the time when a license plate leaves the storage and is put into the storage.

Alternatively, or in addition, the control system may be configured to store user information indicative of the identify of a user accessing the storage.

BRIEF DESCRIPTION OF THE DRAWINGS

Further details, advantages and aspects of the present disclosure will become apparent from the following description taken in conjunction with the drawings, wherein.

DETAILED DESCRIPTION

In the following, an identification device for a license plate, a license plate arrangement and a license plate system, will be described. The same or similar reference numerals will be used to denote the same or similar structural features.

Figure 1A:
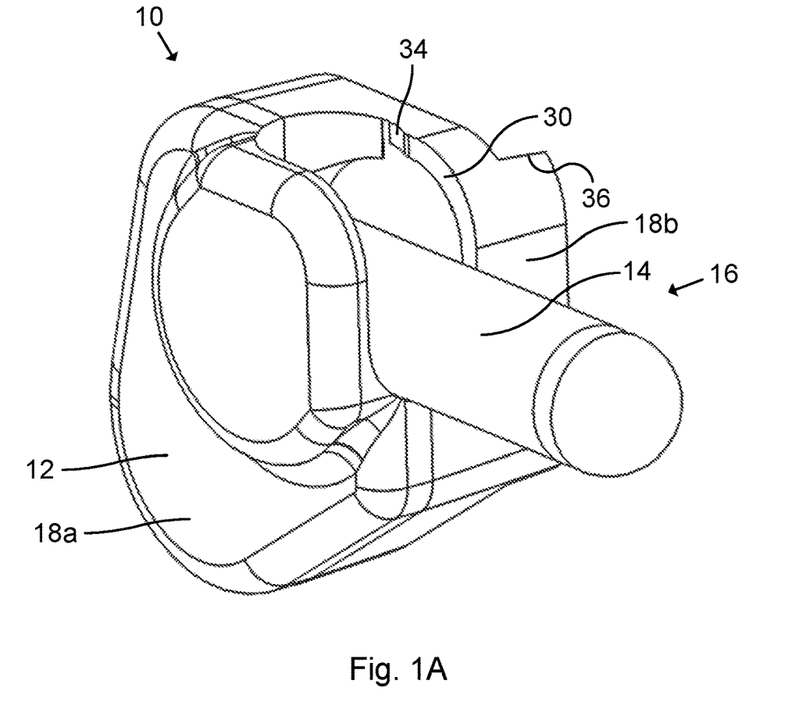
FIG. 1A: schematically represents a perspective side view of an identification device when a movable member is in an extended position.
Figure 1B:
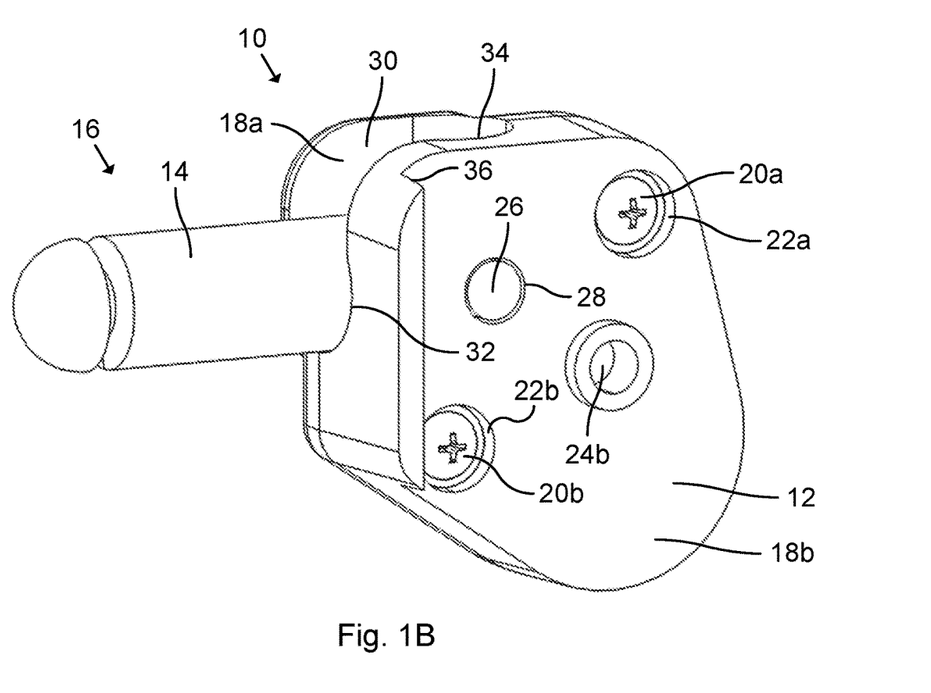
FIG. 1B: schematically represents a perspective rear view of the identification device when the movable member is in the extended position.

FIG. 1A schematically represents a perspective side view of an identification device 10, and FIG. 1B schematically represents a perspective rear view of the identification device 10. With collective reference to FIGS. 1A and 1B, the identification device 10 comprises a base structure 12 and a movable member 14.

The movable member 14 is movable relative to the base structure 12. In FIGS. 1A and 1B, the movable member 14 is in an extended position 16 in relation to the base structure 12.

The base structure 12 of this example is made of plastic. The base structure 12 of this example comprises a first half 18a and a second half 18b. The first half 18a and the second half 18b are mated and secured together, for example by using two screws 20a and 20b passing through a first through hole 22a and a second through hole 22b, respectively, in the second half 18b. The movable member 14 is in this example positioned between the first half 18a and the second half 18b. The second half 18b of this example further comprises a second fastening hole 24b.

The movable member 14 is here exemplified as an elongated cylindrical body. One end of the movable member 14 extends outside the base structure 12. The other end of the movable member 14 is rotatably connected to the base structure 12 to rotate about a pivot pin 26. In this example, the pivot pin 26 is integrally formed with the first half 18a and is received in a pivot opening 28 in the second half 18b. The movable member 14 of this example is an intelligent fob (iFob), such as the Traka iFob.

The base structure 12 of this example comprises a slot 30. An extended position seat 32 is provided at one end of the slot 30, and a retracted position seat 34 is provided at the opposite end of the slot 30. In this example, the extended position seat 32 and the retracted position seat 34 are both arc-shaped and provided in the second half 18b. When the movable member 14 is in the extended position 16, the movable member 14 is seated and held in the extended position seat 32.

The base structure 12 of this example further comprises a license plate seat 36. In this example, the license plate seat 36 is provided in the second half 18b. The license plate seat 36 of this example is a step comprising two perpendicular surfaces. In this example, the movable member 14 is perpendicular to one of the surfaces, and parallel with the other of the surfaces, of the license plate seat 36 in the extended position 16.

Figure 2A:
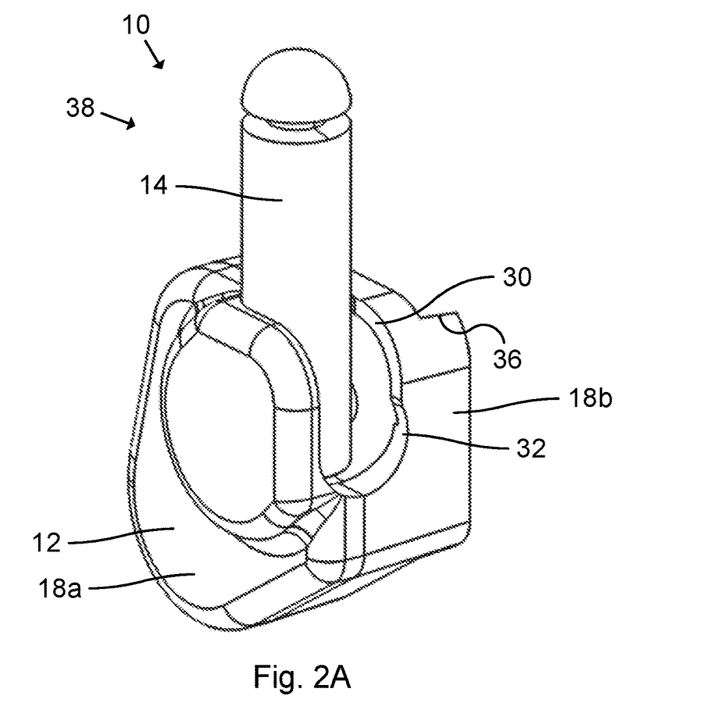
FIG. 2A: schematically represents a perspective side view of the identification device when the movable member is in a retracted position.
Figure 2B:
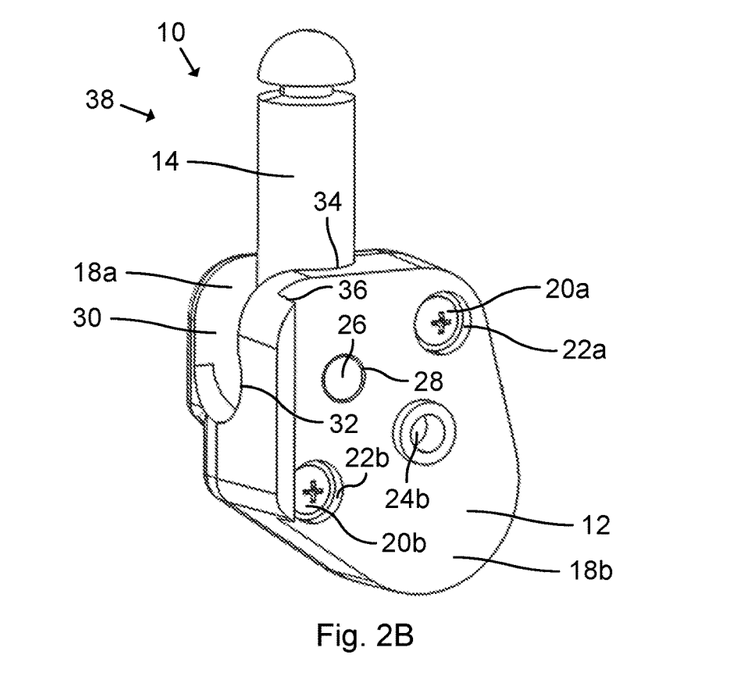
FIG. 2B: schematically represents a perspective rear view of the identification device when the movable member is in the retracted position.

FIG. 2A schematically represents a perspective side view of the identification device 10, and FIG. 2B schematically represents a perspective rear view of the identification device 10. With collective reference to FIGS. 2A and 2B, the movable member 14 is in a retracted position 38 in relation to the base structure 12. In this example, the movable member 14 is parallel with both surfaces of the license plate seat 36 in the retracted position 38.

The movable member 14 can be manually moved from the extended position 16 to the retracted position 38. In this example, the movable member 14 rotates 90 degrees about the pivot pin 26 between the extended position 16 and the retracted position 38. In the retracted position 38, the movable member 14 is seated and held in the retracted position seat 34. The movable member 14 can thus travel along the slot 30 between the extended position seat 32 and the retracted position seat 34 under the force of a user.

The base structure 12 may undergo a slight elastic deformation when the movable member 14 travels between the extended position seat 32 and the retracted position seat 34. The extended position seat 32 and the retracted position seat 34 provide two distinct positions for the movable member 14.

Figure 3A:
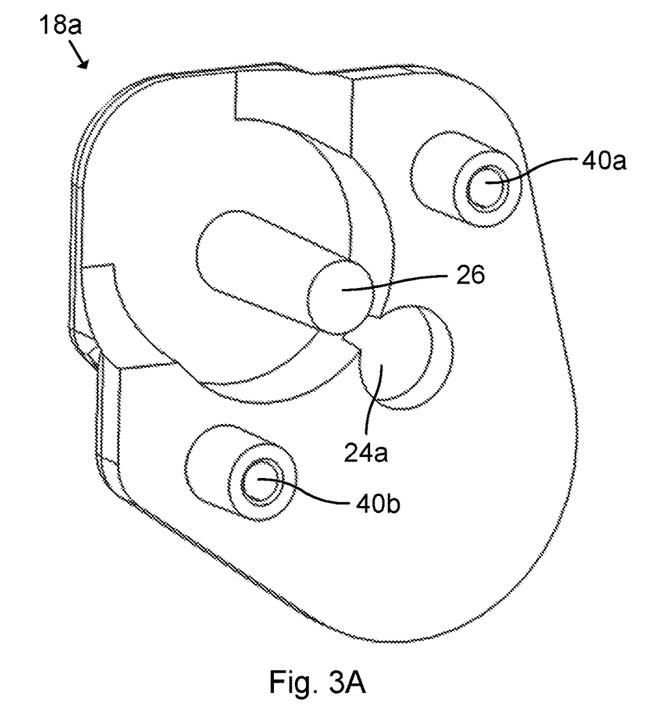
FIG. 3A: schematically represents a perspective rear view of a first half of a base structure of the identification device.

FIG. 3A schematically represents a perspective rear view of the first half 18a of the base structure 12. As shown, the first half 18a of this example comprises a first blind hole 40a for receiving the first screw 20a and a second blind hole 40b for receiving the second screw 20b. When the first half 18a is secured to the second half 18b, the first blind hole 40a aligns with the first through hole 22a and the second blind hole 40b aligns with the second through hole 22b.

The first half 18a of this example further comprises a first fastening hole 24a. The first fastening hole 24a aligns with the second fastening hole 24b when the first half 18a is secured to the second half 18b. In this example, the pivot pin 26 is integrally formed with the first half 18a.

Figure 3B:
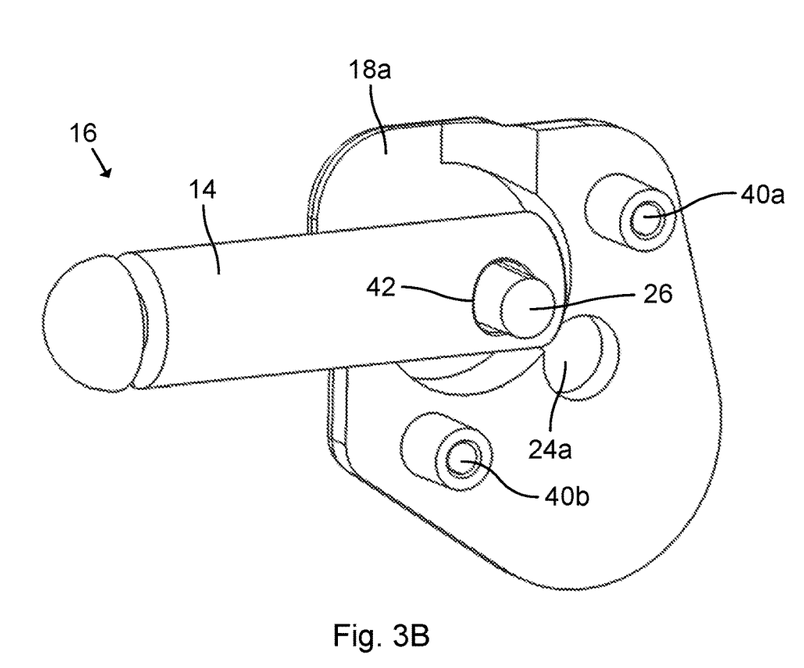
FIG. 3B: schematically represents a perspective rear view of the first half and the movable member.

FIG. 3B schematically represents a perspective rear view of the first half 18a and the movable member 14. As shown in FIG. 3B, the pivot pin 26 passes through a movable member hole 42 in the movable member 14. In this way, the movable member 14 can pivot around the pivot pin 26. A length of the movable member 14 is in this example approximately four times a width of the movable member 14.

Figure 3C:
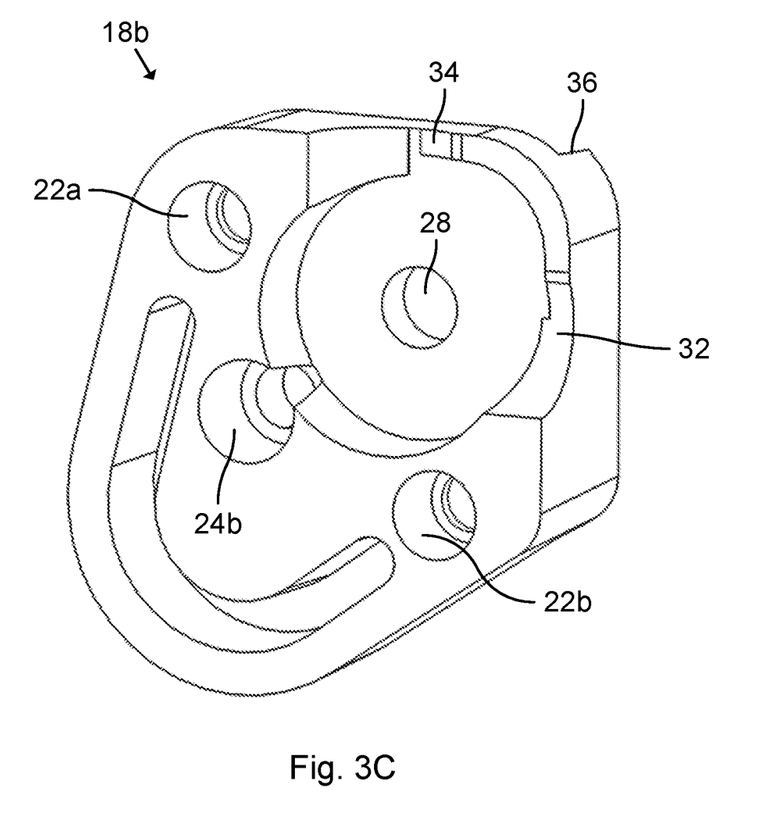
FIG. 3C: schematically represents a perspective front view of a second half of the base structure.

FIG. 3C schematically represents a perspective front view of the second half 18b. In FIG. 3C, the extended position seat 32, the retracted position seat 34, the first through hole 22a, the second through hole 22b and the second fastening hole 24b can be seen more clearly.

Figure 4A:
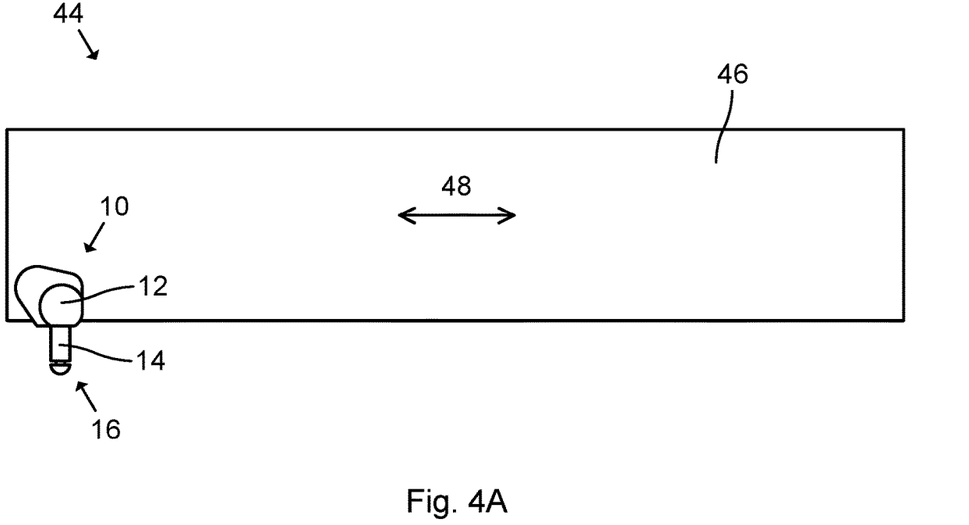
FIG. 4A: schematically represents a front view of a license plate arrangement comprising a license plate and the identification device attached to the license plate when the movable member is in the extended position.

FIG. 4A schematically represents a front view of a license plate arrangement 44. The license plate arrangement 44 comprises a license plate 46 and the identification device 10 attached to the license plate 46. The license plate 46 is here exemplified as a dealer license plate. In FIG. 4A, the movable member 14 is in the extended position 16. In this example, the movable member 14 is parallel with the license plate 46 and protrudes outside the license plate 46 in a direction transverse to a main extension direction or length direction 48 of the license plate 46. Moreover, the movable member 14 is offset from the license plate 46 a direction normal to the license plate 46 (in front of the license plate 46 in FIG. 4A).

As shown in FIG. 4A, the identification device 10 has a very small size in comparison with the license plate 46. The license plate 46 is rectangular and may have a size of 15.24 cm (6 inches) by 35.56 cm (14 inches). In case the base structure 12 is made of transparent plastic, the base structure 12 does not obscure the lettering on the license plate 46.

Figure 4B:
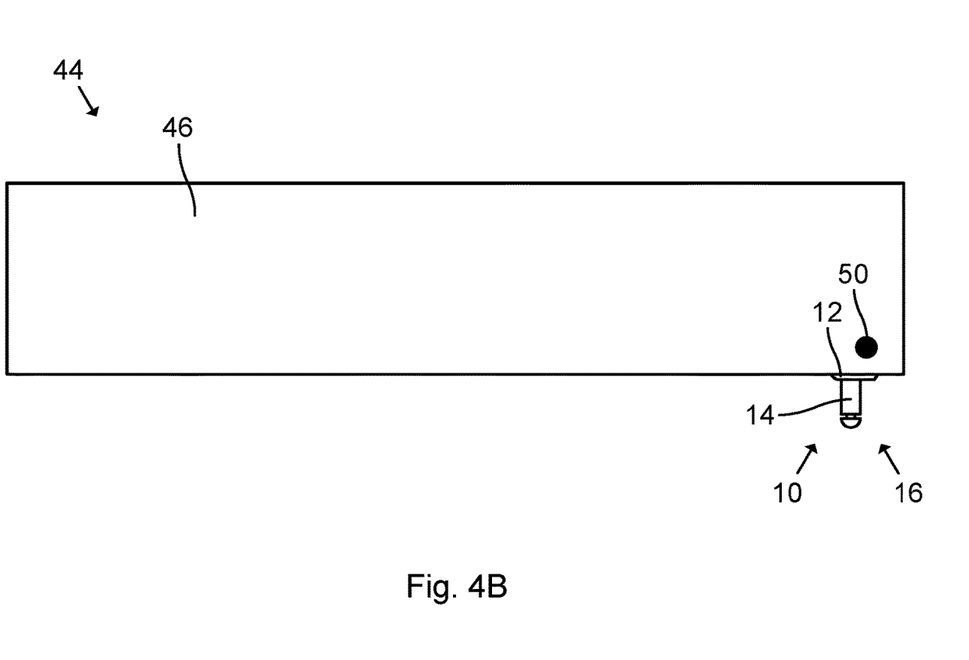
FIG. 4B: schematically represents a rear view of the license plate arrangement in FIG. 4A.

FIG. 4B schematically represents a rear view of the license plate arrangement 44 in FIG. 4A. The license plate arrangement 44 of this example comprises a fastener 50. FIG. 4B shows that the base structure 12 of the identification device 10 is affixed to the license plate 46 by the fastener 50. In this example, the fastener 50 passes through the license plate 46, through the second fastening hole 24b, and into the first fastening hole 24a. The identification device 10 can thus be secured to the license plate 46 with very little modification of the license plate 46. The fastener 50 of this example is a pop rivet. Any tampering or efforts to remove the identification device 10 from the license plate 46 will therefore be visible.

Figure 4C:
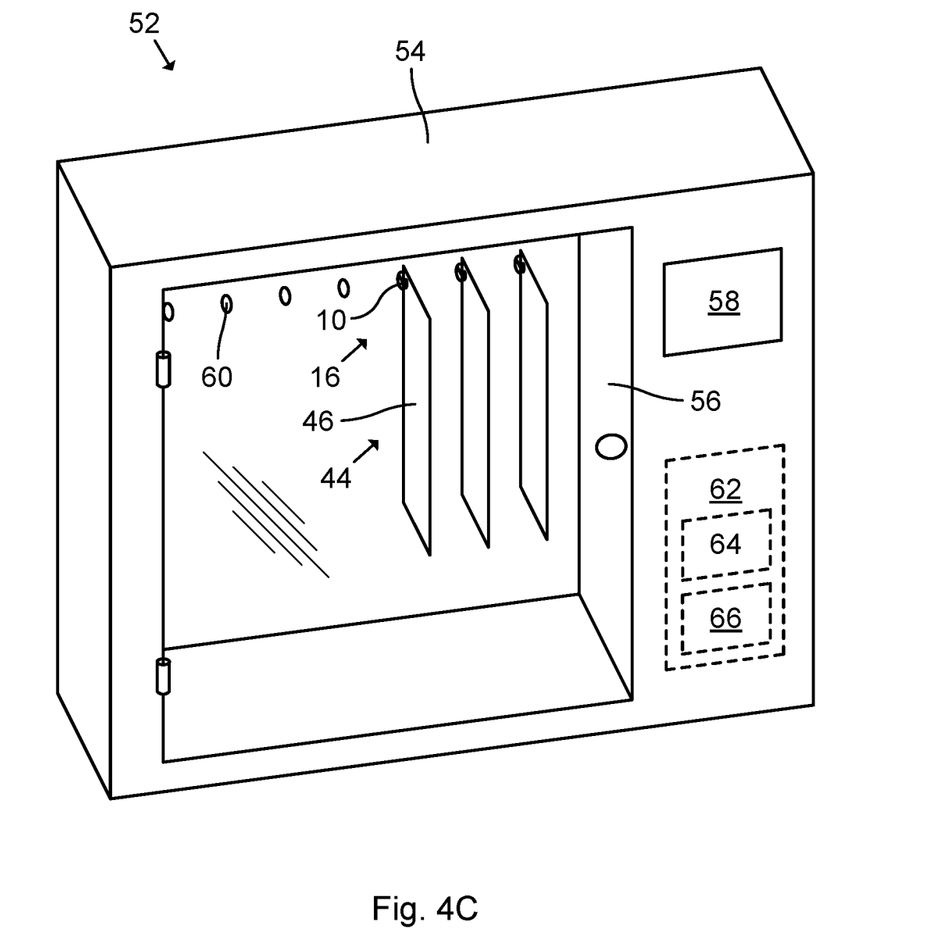
FIG. 4C: schematically represents a license plate system comprising a storage and a plurality of license plate arrangements.

FIG. 4C schematically represents a license plate system 52. The license plate system 52 comprises a storage 54. The storage 54 is here exemplified as a cabinet comprising a lockable door 56 and a user interface 58, such as a touchscreen. The license plate system 52 may be located at a vehicle dealer.

The license plate system 52 further comprises a plurality of license plate arrangements 44 stored in the storage 54. The storage 54 comprises a plurality of storage holes 60. As illustrated, the storage holes 60 are arranged along a horizontal line in this example. Each storage hole 60 is configured to receive a movable member 14 in its extended position 16. Each license plate arrangement 44 is thereby suspended in a unique storage hole 60 by the movable member 14 in the extended position 16. In the specific and non-limiting illustration in FIG. 4C, the storage 54 comprises eight storage holes 60 and three of these storage holes 6o receive a movable member 14 of a respective identification device 10. The identification device 10 creates a new way of storing license plates 46. As shown in FIG. 4C, the license plate system 52 enables a tidy storage of the license plates 46.

The license plate system 52 comprises an electronic control system 62. The control system 62 may for example be located in the storage 54. The control system 62 comprises a data processing device 64 and a memory 66. The memory 66 has a computer program stored thereon. The computer program comprises program code which, when executed by the data processing device 64, causes the data processing device 64 to perform, or command performance of, various steps as described herein. The control system 62 is configured to store information associated with the license plates 46, such as removal and insertion information and times for these events. The storage 54 enables a better control over who can access the license plates 46 and keeps track of which license plates 46 are held therein and which license plates 46 are removed therefrom. The vehicle dealer is thus provided with information regarding which license plates 46 are kept in the storage 54 at each point in time.

Figure 4D:
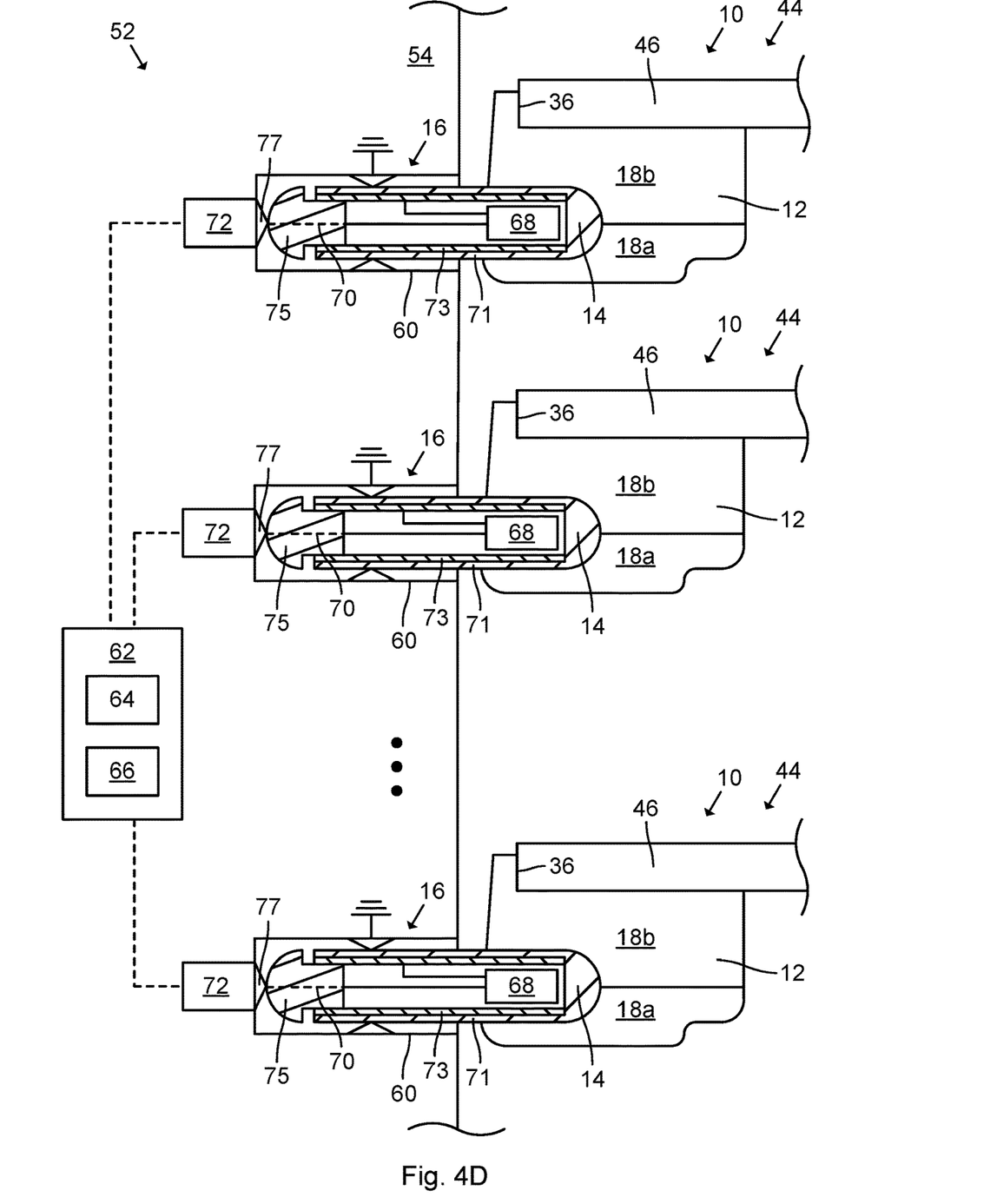
FIG. 4D: schematically represents a partial cross-sectional top view of the license plate system.

FIG. 4D schematically represents a partial cross-sectional top view of the license plate system 52. In the example in FIG. 4D, each movable member 14 contains electronic circuitry 68. Each electronic circuitry 68 is configured to transfer unique identification data 70, such as a unique identification number. Each electronic circuitry 68 may optionally be positioned elsewhere with respect to the respective identification device 10.

The electronic circuitry 68 comprises a data store having a read only memory portion for storing the unique identification data 70. The electronic circuitry 68 may also have a re-writable memory portion for storing additional information, for example about the user.

In this specific and non-limiting example, the movable member 14 comprises a metal outer sleeve 71 and an insulating material 73. The insulating material 73 electrically insulates at least a portion of an internal bore defined by the outer sleeve 71.

The movable member 14 of this example further comprises a movable member contact 75. The movable member contact 75 fits into the open end of the outer sleeve 71 and is electrically insulated from the outer sleeve 71 by the insulating material 73. The electronic circuitry 68 has connections to the outer sleeve 71 and the movable member contact 75.

The storage 54 comprises a plurality of readers 72, each associated with a respective storage hole 6o. The readers 72 are in signal communication with the control system 62. In this specific and non-limiting example, each reader 72 comprises a reader contact 77. When the movable member 14 is received in the storage hole 6o, the movable member contact 75 is brought into electrical contact with the reader contact 77 and the outer sleeve 71 is electrically connected to ground. The reader 72 can now read the identification data 70, associated with the identification device 10 and the license plate 46, from the electronic circuitry.

FIG. 4D further shows that an edge of each license plate 46 is seated in the license plate seat 36 of the base structure 12 of the respective identification device 10. The license plate seat 36 forms one example of a license plate attachment structure.

Before a user accesses the storage 54 to retrieve an license plate arrangement 44, i.e. a license plate 46 with the identification device 10 fixed thereto, the user is in this example asked to enter his/her credentials to the user interface 58. Upon entry of valid credentials, the control system 62 unlocks the door 56 and gives the user access to the storage 54. When a license plate arrangement 44 is removed from the storage 54, the control system 62 may store the identification data 70, the time when the license plate arrangement 44 was removed, and/or the credentials of the user. In this way, the license plate system 52 can keep track of the license plates 46. When a user returns the license plate arrangement 44 and inserts the movable member 14 into a storage hole 60, the control system 62 receives the identification data 70 from the reader 72 associated with the storage hole 60 and stores the identification data 70. The control system 62 may further store the time when the license plate arrangement 44 was returned to the storage 54 and/or the identity of the user accessing the storage 54.

Figure 5A:
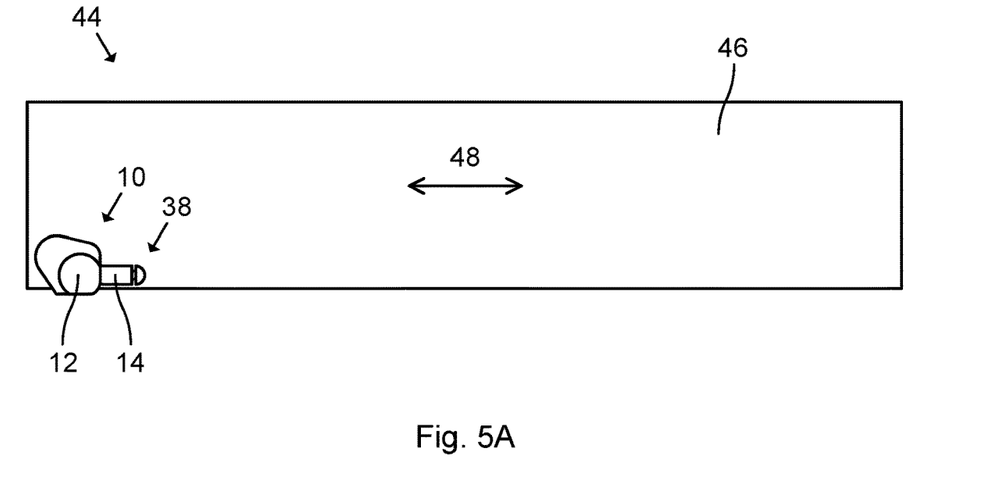
FIG. 5A: schematically represents a front view of the license plate arrangement when the movable member is in the retracted position.

FIG. 5A schematically represents a front view of the license plate arrangement 44. In FIG. 5A, the movable member 14 is in the retracted position 38. The movable member 14 is movable from the extended position 16 to the retracted position 38 in a plane parallel with the license plate 46, here in parallel with the drawing plane of FIG. 5A. In the retracted position 38, the movable member 14 is parallel with the main extension direction or length direction 48 of the license plate 46. Moreover, the movable member 14 is offset from the license plate 46 a direction normal to the license plate 46 (in front of the license plate 46 in FIG. 5A).

Figure 5B:
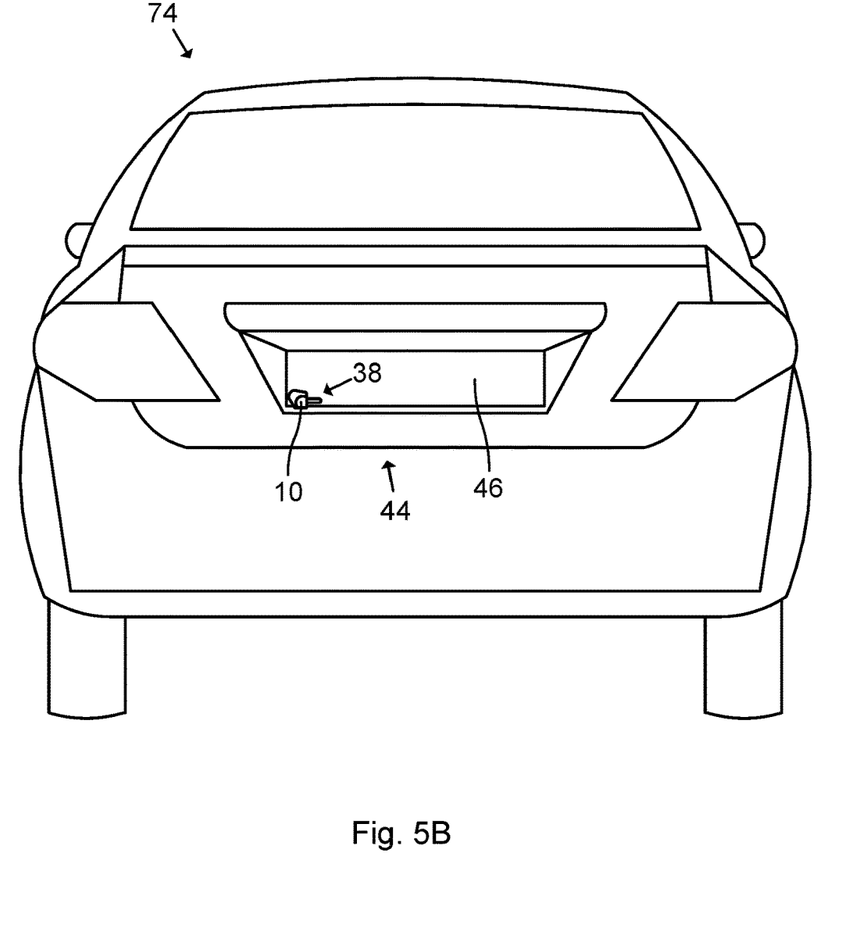
FIG. 5B: schematically represents a rear view of a vehicle and the license plate arrangement attached to the vehicle.

FIG. 5B schematically represents a rear view of a vehicle 74. The license plate arrangement 44 is attached to the vehicle 74. The retracted position 38 of the movable member 14 facilitates attachment of the license plate arrangement 44 to the vehicle 74. When the movable member 14 is in the retracted position 38, the vehicle 74 is protected from being damaged by the movable member 14. Since the movable member 14 lies in parallel with the length direction 48 of the license plate 46 in the retracted position 38, the movable member 14 only covers a small part at the very edge of the license plate 46. A risk that the movable member 14 obstructs any information on the license plate 46 is thereby very low or eliminated.

The present disclosure provides the following itemized listing of embodiments:

1. An identification device 10 for a license plate 46, the identification device 10 comprising:
   a base structure 12 for attachment to the license plate 46;
   a movable member 14 movable relative to the base structure 12 between a retracted position 38 and an extended position 16; and
   electronic circuitry 68 configured to transfer identification data 70 associated with the identification device 10.
2. The identification device 10 according to item 1, wherein the electronic circuitry 68 is located in the movable member 14.
3. The identification device 10 according to any of the preceding items, wherein the movable member 14 is rotatable relative to the base structure 12 between the retracted position 38 and the extended position 16.
4. The identification device 10 according to item 3, wherein the movable member 14 is rotatable at least 80 degrees between the retracted position 38 and the extended position 16.
5. The identification device 10 according to any of the preceding items, wherein the movable member 14 is elongated.
6. The identification device 10 according to any of the preceding items, wherein the movable member 14 in the retracted position 38 is parallel with the license plate 46 and offset from the license plate 46 in a direction normal to the license plate 46 when the identification device 10 is connected to the license plate 46.
7. The identification device 10 according to any of the preceding items, wherein the movable member 14 in the extended position 16 is parallel with the license plate 46 and protrudes outside the license plate 46 when the identification device 10 is connected to the license plate 46.
8. The identification device 10 according to any of the preceding items, wherein the base structure 12 comprises two halves 18a, 18b.
9. The identification device 10 according to any of the preceding items, wherein the base structure 12 is made of plastic.
10. The identification device 10 according to any of the preceding items, wherein the base structure 12 is transparent.
11. The identification device 10 according to any of the preceding items, wherein the electronic circuitry 68 is configured to wirelessly transmit the identification data 70.
12. A license plate arrangement 44 comprising a license plate 46 and an identification device 10 according to any of the preceding items fixedly attached to the license plate 46.
13. The license plate arrangement 44 according to item 12, wherein the movable member 14 is movable between the retracted position 38 and the extended position 16 in a plane parallel with the license plate 46.
14. The license plate arrangement 44 according to item 12 or 13, further comprising a fastener 50, wherein the identification device 10 is fixedly attached to the license plate 46 by the fastener 50.
15. The license plate arrangement 44 according to item 14, wherein the fastener 50 is a deformable single use fastener.
16. A license plate system 52 comprising at least one license plate arrangement 44 according to any of items 12 to 15 and a storage 54 configured to store the at least one license plate arrangement 44.
17. The license plate system 52 according to item 16, wherein the storage 54 comprises one or more storage holes 60, each for receiving the movable member 14 in the extended position 16.
18. The license plate system 52 according to item 17, wherein the storage 54 comprises a reader 72 configured to receive the identification data 70 from the electronic circuitry 68.
19. The license plate system 52 according to item 18, further comprising an electronic control system 62 including at least one data processing device 64 and at least one memory 66 having at least one computer program stored thereon, the at least one computer program comprising program code which, when executed by the at least one data processing device 64, causes the at least one data processing device 64 to perform the steps of:
   receiving the identification data 70 from the reader 72; and
   storing the identification data 70.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. An identification device for a license plate, the identification device comprising:
   a base structure configured for attachment to the license plate and comprising a pivot pin;
   an elongated movable member rotatable relative to the base structure between a retracted position and an extended position around the pivot pin in a plane transverse to the pivot pin; and electronic circuitry located in the movable member and configured to transfer identification data associated with the identification device.

2. The identification device according to claim 1, wherein the movable member is rotatable at least 80 degrees between the retracted position and the extended position.

3. The identification device according to claim 1, wherein the movable member is configured to be parallel with the license plate and offset from the license plate in a direction normal to the license plate when the identification device is connected to the license plate and the movable member is in the retracted position.

4. The identification device according to claim 1, wherein the movable member is configured to be parallel with the license plate and protrude outside the license plate when the identification device is connected to the license plate and the movable member is in the extended position.

5. The identification device according to claim 1, wherein the base structure comprises two halves.

6. The identification device according to claim 1, wherein the base structure is made of plastic.

7. The identification device according to claim 1, wherein the base structure is transparent.

8. The identification device according to claim 1, wherein the electronic circuitry is configured to wirelessly transmit the identification data.

9. A license plate arrangement comprising:

a license plate; and an identification device fixedly attached to the license plate, the identification device comprising:

a base structure configured for attachment to the license plate and comprising a pivot pin;

an elongated movable member rotatable relative to the base structure between a retracted position and an extended position around the pivot pin in a plane transverse to the pivot pin; and electronic circuitry located in the movable member and configured to transfer identification data associated with the identification device.

10. The license plate arrangement according to claim 9, wherein the movable member is rotatable between the retracted position and the extended position in a plane parallel with the license plate.

11. The license plate arrangement according to claim 9, further comprising a fastener, wherein the identification device is fixedly attached to the license plate by the fastener.

12. The license plate arrangement according to claim 11, wherein the fastener is a deformable single use fastener.

* * * * *